US007907258B2

(12) United States Patent
Rothman et al.

(10) Patent No.: US 7,907,258 B2
(45) Date of Patent: Mar. 15, 2011

(54) METHOD OF DETECTING A LIGHT PULSE REFLECTED ON AN OBJECT TO DETERMINE THE DISTANCE FROM THE OBJECT, SENSOR AND DEVICE FOR IMPLEMENTING SAME

(75) Inventors: Johan Rothman, Lans en Vercors (FR); Eric De Borniol, St Paul de Varces (FR)

(73) Assignee: Commissariat a l'Energie Atomique, Paris (FR)

( * ) Notice: Subject to any disclaimer, the term of this patent is extended or adjusted under 35 U.S.C. 154(b) by 56 days.

(21) Appl. No.: 12/261,420

(22) Filed: Oct. 30, 2008

(65) Prior Publication Data

US 2009/0141262 A1 Jun. 4, 2009

(30) Foreign Application Priority Data

Nov. 2, 2007 (FR) ...................................... 07 07723

(51) Int. Cl.
*G01C 3/08* (2006.01)
(52) U.S. Cl. ...................................... 356/5.01; 356/4.07
(58) Field of Classification Search .................. 356/4.07, 356/5.01
See application file for complete search history.

(56) References Cited

U.S. PATENT DOCUMENTS

| 4,129,780 | A | * | 12/1978 | Laughlin ........................ 250/333 |
| 4,854,698 | A | * | 8/1989 | Schmidt ........................ 356/5.03 |
| 5,216,259 | A | | 6/1993 | Stern et al. |
| 5,633,706 | A | * | 5/1997 | Cho et al. ...................... 356/5.01 |
| 6,867,808 | B1 | * | 3/2005 | Boden ........................... 348/348 |
| 7,016,519 | B1 | | 3/2006 | Nakamura et al. |
| 2002/0143506 | A1 | | 10/2002 | D'Aligny et al. |
| 2004/0119541 | A1 | | 6/2004 | Seetharaman et al. |

* cited by examiner

*Primary Examiner* — Isam Alsomiri
(74) *Attorney, Agent, or Firm* — Oblon, Spivak, McClelland, Maier & Neustadt, L.L.P.

(57) ABSTRACT

A method of detecting a light pulse reflected on an object, including steps of: emitting a light pulse of known intensity and duration towards the object; detecting a reflection signal of the light pulse on the object during a first integration time, wherein the detecting is carried out with at least one gain sensor that amplifies the reflection signal; on detection during the first integration time, varying an amplification gain of the at least one sensor in a controlled manner so that the amplification gain at each instant of the first integration time is known; and determining a time of return of the reflection signal by evaluating the amplification gain of the reflection signal.

15 Claims, 7 Drawing Sheets

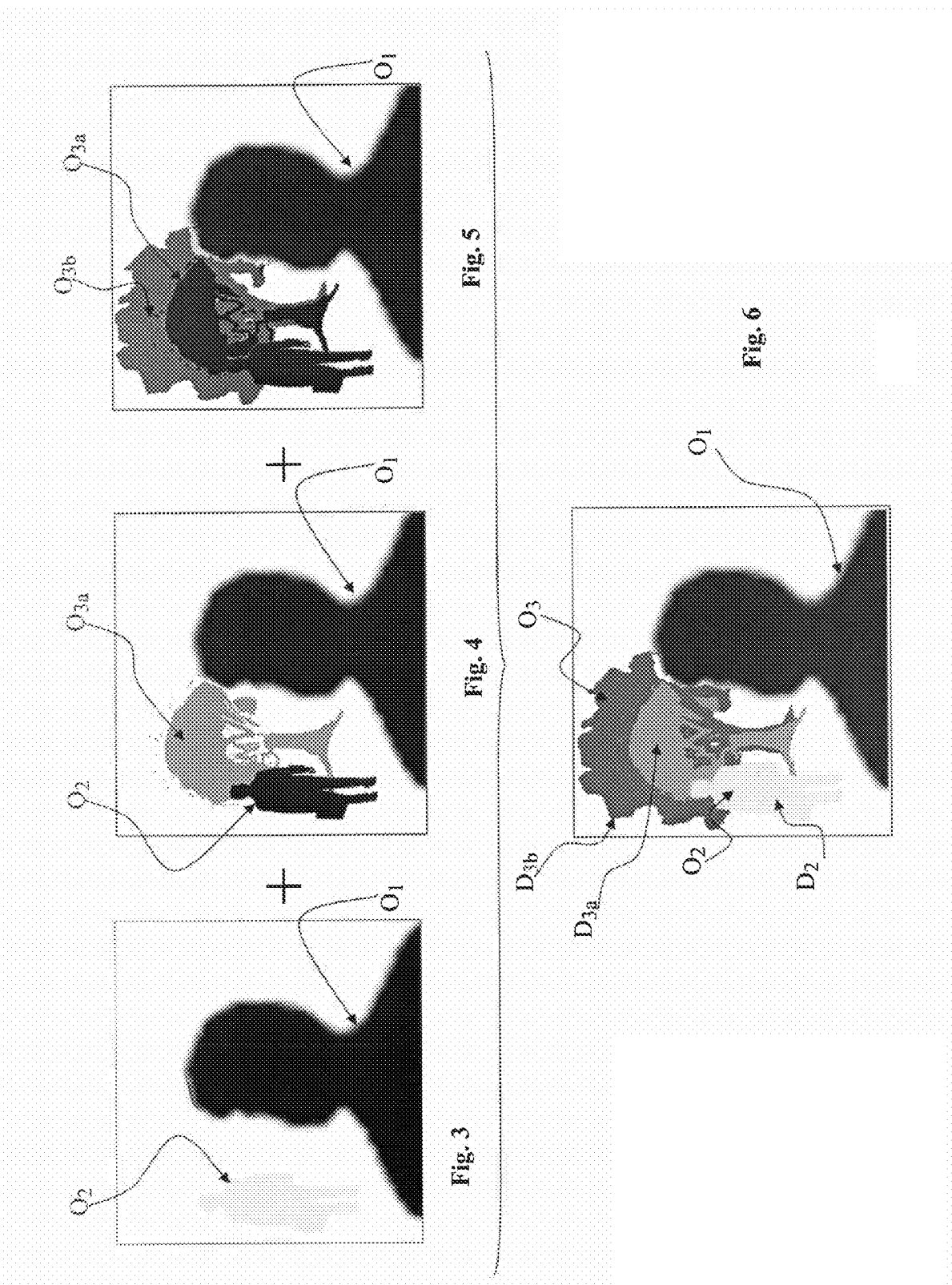

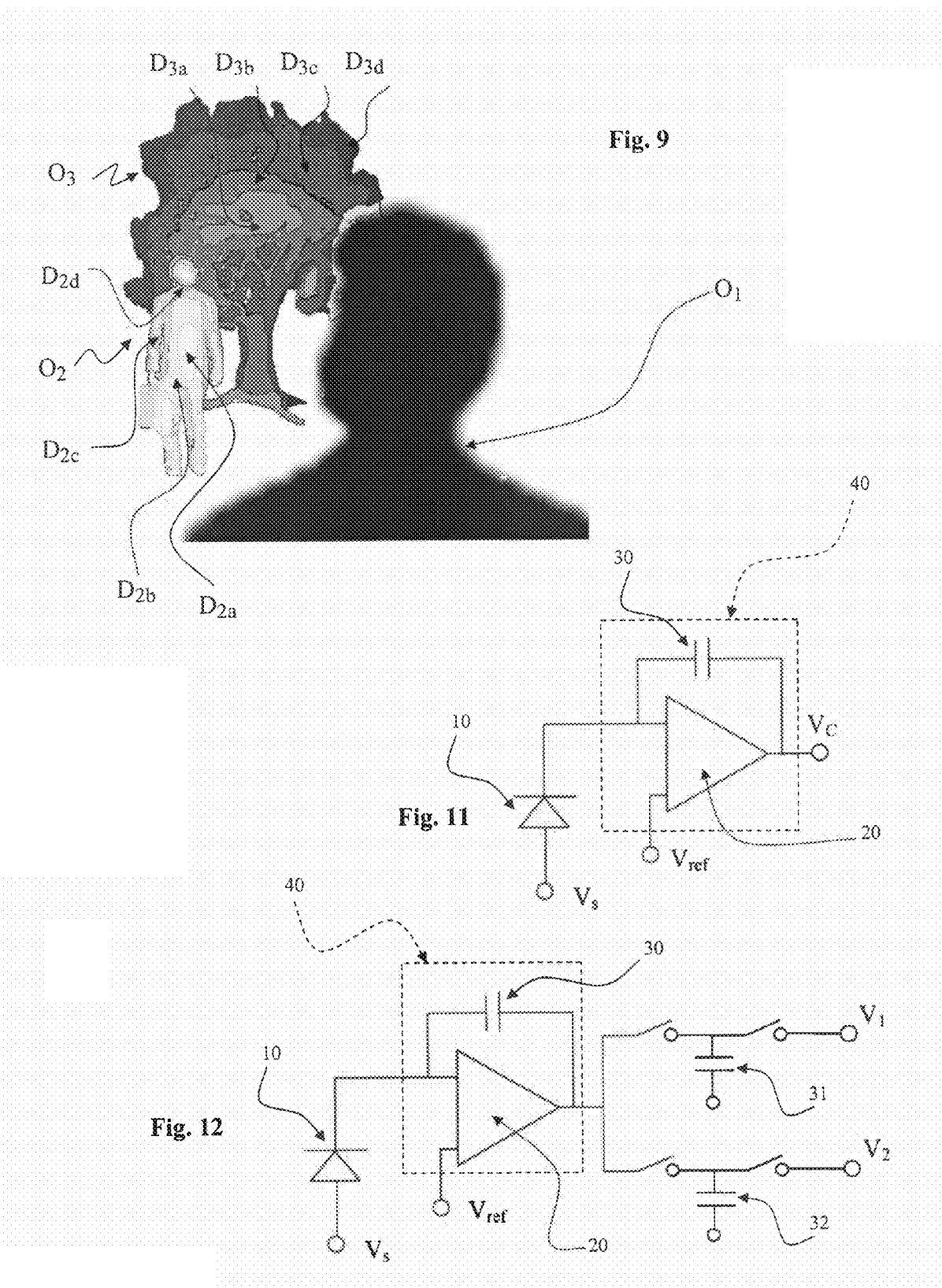

METHOD OF DETECTING A LIGHT PULSE REFLECTED ON AN OBJECT TO DETERMINE THE DISTANCE FROM THE OBJECT, SENSOR AND DEVICE FOR IMPLEMENTING SAME

BACKGROUND OF THE INVENTION

1. Field of the Invention

The present invention relates to a method of detecting a light pulse reflected on an object, to a sensor and a device for implementing same making it possible to determine the distance separating an object from the sensor or the distance between two objects.

2. Description of the Related Art

The active light imaging principle consists in emitting a light pulse towards the scene or the object that is to be observed, detecting the light pulse after the latter has been reflected on the object, then displaying the detected signal on a display interface or processing the data for subsequent use. The detection is carried out using a detection device comprising a matrix of individual sensors each defining a pixel of the image. Examples of these are CCD (charge-coupled device) sensors and CMOS (complementary metal-oxide-semiconductor) sensors. Such a matrix these days comprises several millions of these individual sensors thus defining images comprising several megapixels.

Generally, two types of imaging are distinguished, namely 2D imaging and 3D imaging. 2D imaging is based on the emission of a light pulse which is reflected on a scene, followed by its detection by the matrix of individual sensors each of which collects a certain quantity of photons reflected by the observed object. Each sensor then transmits a signal proportional to the number of photons that it has received and this signal is displayed on each pixel of the image. There is thus obtained an indication on the reflectivity of the observed object relative to the scene surrounding it. Generally, the detection of the reflected light pulse is not carried out immediately after the emission of the light pulse but begins after a determined delay $t_d$, and is performed during a time period $\delta t$, called "integration time".

The delay $t_d$ determines the minimum observation distance $I_{min}$ (because $I_{min}=c*t_d/2$, where c is the speed of light) and the integration time $\delta t$ determines the maximum distance $I_{max}$ (because $I_{max}=c*(t_d+\delta t)/2$). The closer the object is to the detection device, the more quickly the light pulse is reflected on the object. Thus, by controlling the delay $t_d$ and the integration time $\delta t$, the user determines the objects that he can observe. This is illustrated in FIG. 1 in which a user (not represented) has an active imaging device A of the state of the art able to emit light pulses whose path is represented by the broken lines B. The light pulse is emitted at the time $t_0$ by the device A towards the observed objects. The detection phase is delayed by a delay $t_d$ relative to the moment of emission $t_0$ and lasts for a time period $\delta t$. The part of the light pulse $P_1$ which is reflected on the object O1 therefore returns to the device A before the detection phase begins, that is before the delay $t_d$. Consequently, the object O1 is not detected since it is located in front of the minimum observation distance $I_{min}$.

Between the time $t_d$ and the time $t_d+\delta t_1$, the individual sensors of the detection device store the photons of the part P2 of the light pulse reflected by the object O2. At the time $t_d+\delta t_1$, each individual sensor transmits a signal proportional to the number of photons that it has received during the time interval $\delta t_1$. This signal is transmitted to a data processing circuit then to an image display interface. This image is illustrated in FIG. 2 where it can be seen that the object O1 situated in front of the minimum observation distance is represented by a blurred silhouette, without contrast, with poorly-defined outline, whereas the object O2, whose signal has been picked up, is clear and contrasted. Finally, the part P3 of the light pulse reflected by the object O3 is not picked up because, given the distance from the object O3, it arrives after the integration time $\delta t_1$. The object O3 therefore does not appear on the image. It should appear normally in black (absence of detection of photons), but for reasons of clarity in the figure, it has not been represented. The result displayed is a reflectance image which makes it possible to distinguish the objects from each other according to their capacity to return the light pulse. If the human eye can understand that the object O1 is located in front of the object O2, it is impossible to determine with precision by what distance the objects O1 and O2 are separated.

In order to access this information, the state of the art proposes reducing to the maximum the detection time $\delta t$ and emitting a large number of light pulses with increasing delays $t_d$ (see FIGS. 1, 3, 4 and 5), then combining the information from each image to "construct" the distance information. Thus, FIG. 3 illustrates that which is detected during the integration time $\delta t_1$. The object O1 is not detected (illustrated in black), but the object O2 is detected. The image is coded as a distance image and represents the information supplied by all the individual sensors which have picked up a light signal during the integration time $\delta t_1$. The distance D2 of the object O2 is calculated from the speed of propagation of light and the integration time $\delta t_1$. All the objects situated behind the object O2 are not detected. They appear normally in black (absence of detection of photons), but for reasons of clarity in the figure, they have not been represented.

FIG. 4 illustrates that which is detected during the integration time $\delta t_2$. The objects O1 and O2 are not detected (illustrated in black), but a first part O3a of the object O3 is perfectly detected. The image is coded as a distance image and represents the information supplied by all the individual sensors which have picked up a light signal during the integration time $\delta t_2$. The first part O3a of the object O3 is then situated at the distance D3a. The part O3b of the object O3 situated behind the part O3a is not detected but has not been represented.

Finally, FIG. 5 illustrates that which is detected during the integration time $\delta t_3$. The objects O1, O2 and O3a are not detected (illustrated in black), but the second part O3b of the object O3 is detected. The image is coded as a distance image and represents the information supplied by all the individual sensors which have picked up a light signal during the integration time $\delta t_3$. The second part O3b of the object O3 is then situated at the distance D3b.

Then, all the data is compiled so as to produce, from the images of FIGS. 3, 4 and 5, an artificial image, illustrated in FIG. 6, which represents the indication supplied by the individual sensors which have picked up a light signal during the integration times $\delta t_1$, $\delta t_2$ and $\delta t_3$. This method is lengthy and complex because it entails processing a large quantity of data. It is costly in energy because a large number of light pulses is needed (in the example illustrated, three pulses are needed; in reality, their number is very much higher). Also, the spatial resolution of the 3D construction from all the 2D images is determined by the time accuracy of the delay offset $t_d$ and the duration of the integration time $\delta t$. Finally, this method is sensitive to the movements of the objects during the succession of light pulses, so that the artificially constructed image is not always accurate.

Other methods of the state of the art for producing 3D imaging are available but to obtain a good resolution in terms of reflectivity and depth, the two indications are processed simultaneously, which requires fast and complex electronic circuits which can limit the resolution in depth and their lateral resolution by imposing a pixel pitch that is great enough to incorporate all the electronic detection compounds in the pixel.

There are also active imaging systems which use gain sensors which can be adjusted according to the distance of the objects to be observed or the power of the light pulses sent. Thus, when the energy loss is great (long observation distances and/or low energy light source), the gain of the sensors is set to the maximum in order to obtain a high sensor sensitivity. In these devices, the gain is an adjustment parameter of the device in the same way as the detection delay $t_d$ and the duration of the integration time $\delta t$. However, once set, the gain does not vary during the integration time $\delta t$. Such a system is described in the article "*a low noise, laser-gated imaging system for long range target identification*" by Ian Baker, Stuart Duncan and Jeremy Copley, published in the review Proceedings of SPIE, volume 5406, pages 133-144, in August 2004. This system also uses a succession of laser pulses that have to be processed before display.

SUMMARY OF THE INVENTION

The present invention aims to overcome the drawbacks of the state of the art by proposing a method of detecting a reflected light pulse that requires only one, even two light pulses, to obtain a distance indication of the objects relative to the detection device, this method being based on a device that is simple to produce, of high resolution, and fast, because it does not involve processing a large quantity of data.

More specifically, the invention relates to a method of detecting a light pulse reflected on an object, comprising the following steps:
c) emitting a light pulse of known intensity and duration towards the object, then
d) detecting a reflection signal of the light pulse on the object during a determined integration time, with at least one gain sensor able to amplify the reflection signal, wherein, on detection during the integration time, the gain of the sensor or sensors is varied in a controlled manner in order to know the gain at each instant of the integration time, and which also comprises the following step:
i) determining the precise instant of return of the reflection signal by evaluating the amplification gain of the reflection signal.

According to other embodiments:
the method can also comprise the following preliminary steps:
a) emitting a light pulse of known intensity and duration towards the object, then
b) detecting a reflection signal of the light pulse on the object during a determined integration time, with at least one gain sensor able to amplify the reflection signal, the gain being kept constant throughout the integration time,
and also comprising a step e) for calculating the ratio of the signal obtained in the step d) to the signal obtained in the step b);
the method can also comprise the following intermediate steps:
f) emitting a light pulse of known intensity and duration towards the object, then
g) detecting a reflection signal of the light pulse on the object during a determined integration time, with at least one gain sensor able to amplify the reflection signal, the gain being kept constant throughout the integration time,
and also comprising a step h) consisting in calculating the ratio of the signal obtained in the step d) to the signal obtained in the step g);
the steps b), d) or g) can begin after a determined detection delay, the detection delay being able to be within the range from 20 nanoseconds to 200 microseconds; and
the integration time can be within the range from 10 nanoseconds to 2 microseconds, preferably in the range from 30 nanoseconds to 300 nanoseconds.

By convention, the steps of the above method are carried out in alphabetical order.

The invention also relates to a sensor of a light signal for implementing the above method, presenting an amplification gain of the received signal, and comprising a photon detector able to generate a signal relative to the number of photons detected, connected to a reading circuit able to integrate the signal generated by the detector into a storage element, further comprising a means of controlling the amplification gain able to vary the gain during the integration time.

According to other embodiments:
the sensor can comprise at least two storage elements, one of which is able to incorporate the signal generated by the detector during the steps c) and d), and the other able to integrate the signal generated during the steps a) and b) or f) and g);
the photon detector and/or the reading circuit can present an amplification gain and the amplification gain control means can act on the photon detector and/or the reading circuit to vary the received signal in a controlled manner during a determined period;
the reading circuit can be able to allow a cyclical integration of the signal emitted by the photon detector during a detection time;
the reading circuit can comprise at least one capacitor connected to a transimpedance amplifier;
the photon detector can be an avalanche photodiode;
the avalanche photodiode can be taken from the group comprising photodiodes made of type II-VI semiconductor material, photodiodes made of type III-V semiconductor material, silicon photodiodes and germanium photodiodes; and
the avalanche photodiode can be made of cadmium-mercury-tellurium.

The invention also relates to an active light imaging device comprising an emitter and a receiver of light pulses, a means of processing the signal emitted by the receiver after reception, in which the receiver comprises a detection matrix provided with preceding sensors of a light signal.

BRIEF DESCRIPTION OF THE DRAWINGS

According to another embodiment, the detection matrix can present an alternation of preceding sensors, the amplification gain control means of which is able to vary the gain during the detection, and sensors for which the amplification gain control means is able to keep the gain constant during the detection.

Other characteristics of the invention will be stated in the detailed description hereinbelow, given with reference to the figures which represent, respectively.

FIGS. 3 to 6, diagrammatic representations of a 3D imaging method of the state of the art;

FIG. 9, a diagrammatic representation of a 3D image obtained with the method according to the invention;

FIGS. 11 and 12, diagrammatic views of two embodiments of sensors according to the invention, adapted to a variation of the gain of the photon detector of the sensor;

DETAILED DESCRIPTION OF THE INVENTION

In the description hereinbelow, the following terms are defined as follows:

Noise: the noise defines random and undesirable signals, even interference signals, that are overlaid on the wanted signals. The concept of signal-to-noise ratio (SNR) is often used to indicate the quality of a measurement or of a data transmission by establishing the ratio between the value of the signal and that of the noise.

Noise factor: the capacity of an electronic component to generate a spurious noise. This factor is obtained by comparing the input SNR with the output SNR to measure the level of the noise added by the equipment.

Gain: the voltage, current or power gain of a circuit is the ratio between the input value of these parameters and that at the output. It can be expressed in decibels (dB). For example, the voltage gain of a circuit in dB is calculated as follows: 20 log(Vout/Vin), where Vout is the output voltage and Vin the input voltage.

Light pulse: light emission of a given energy for a predetermined duration, less, generally, than a nanosecond; the light pulses can be obtained from laser devices or from other light devices, such as light-emitting diodes, the objective being an emission of photons.

Power: energy supplied per unit of time to a system by another system.

Avalanche effect: when an avalanche-effect diode is subjected to a significant reverse polarization, the electrons and/or the holes reach, within the PN junction, a very high energy which favors the interactions between the carriers, which makes it possible to generate electron-hole pairs. The number of carriers increases and the phenomenon is reproduced with the initial carrier and the carriers created on interactions, so creating a major amplification effect.

Frame time: time interval between two photographs.

Figure 7:
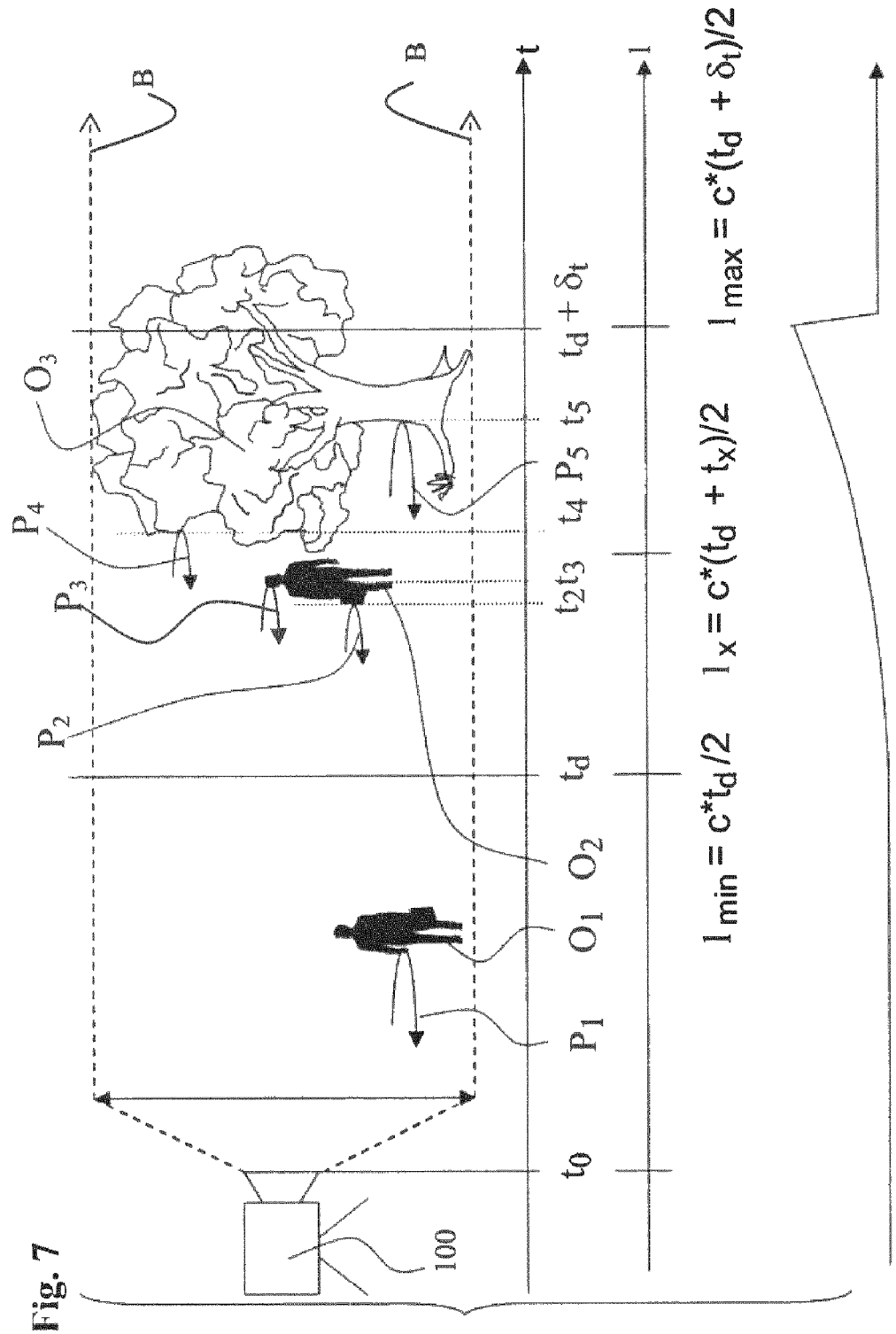
FIG. 7, a diagrammatic view of the implementation of a method of detecting a reflected light pulse according to the present invention.

FIG. 7 illustrates the implementation of a method of detecting a light pulse according to the present invention by an imaging device 100. This device 100 comprises an emitter and a receiver of light pulses, a means of processing the signal emitted by the receiver after reception of the reflected light pulse, and a display interface for the signal processed by the processing means. For reasons of clarity, none of these sub-elements is represented in FIG. 7.

Figure 1:
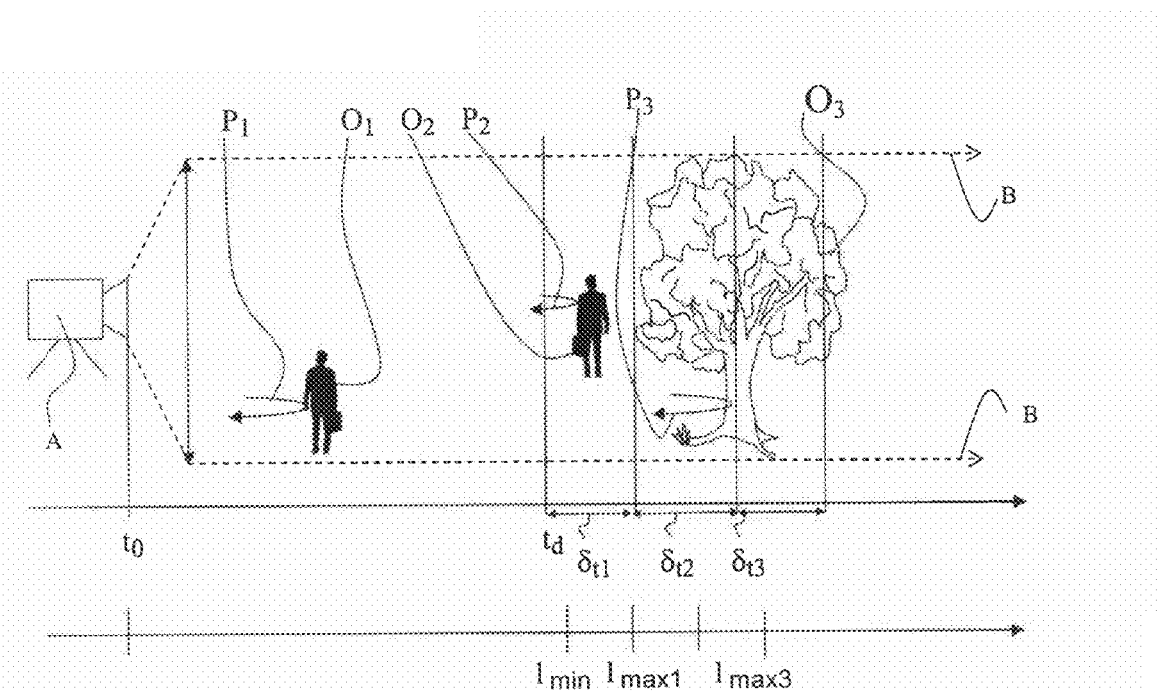
FIG. 1, a diagrammatic view of the implementation of an active imaging method of the state of the art.
Figure 2:
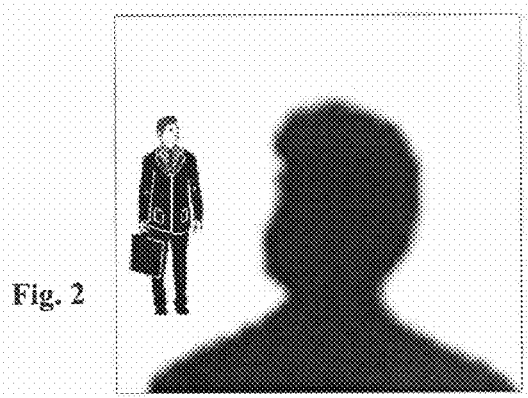
FIG. 2, a diagrammatic representation of a 2D image obtained with the method of the state of the art described in FIG. 1.

The path of the light pulse has been represented, as in FIG. 1, by broken lines B. The emitter of the device 100 therefore emits, towards the scene to be observed, a light pulse of known energy, intensity and duration which can, if necessary, be adjustable.

As in the state of the art described previously, the detection of a reflection signal of the light pulse on an object of the scene being observed begins only after a determined delay $t_d$ and is performed during an integration time $\delta t$.

During the integration time $\delta t$, a proportion P2 of the photons of the light pulse is reflected on a first part of the object O2, then a proportion P3 of the photons of the light pulse is reflected on a second part of the object O2. A proportion P4 is reflected on a first part of the object O3 and another proportion P5 is reflected on a second part of the object O3.

This representation is diagrammatic because each point of the objects returns a proportion of the light pulse.

The method according to the invention consists in varying the gain M of the receiver of the device 100 during the integration time $\delta t$ (see the curve M(t) representing the variation of the gain M as a function of time t). This variation of the gain is done in a controlled manner in order to know the value of the gain at each instant of the integration time $\delta t$.

According to a first embodiment of the detection method according to the invention, it is assumed, as a first approximation, that the number of photons sent in the light pulse is equal to the number of photons reflected on the objects of the scene being observed and detected by the receiver of the device 100 provided with sensors.

In other words, it is assumed that the sensors that have detected photons during the integration time $\delta t$ have each picked up one and the same number of photons. It is therefore possible, thanks to the inventive method, to know the exact moment of the return of the reflected photons and their detection by the sensor.

Figure 10:
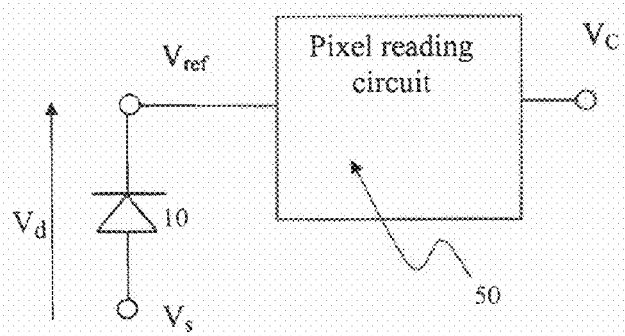
FIG. 10, a diagrammatic view of a sensor according to the invention.

Thus, according to the invention, each individual sensor of the receiver presents a gain that is varied in a control manner during the time $\delta t$. In the example illustrated hereinbelow, the gain M of the sensor varies exponentially when the voltage $V_d$ at the terminals of the photon detector (see the description relating to FIG. 10) varies linearly.

Consequently, two different individual sensors detecting one and the same number of photons at two different instants will transmit different electrical signals. This is illustrated in FIGS. 8a to 8d which represent the signal amplified by four sensors of the receiver having received the proportions P2, P3, P4 and P5 of the light pulse at different instants.

Since the number of photons received by each of the four sensors is considered, as a first approximation, to be identical before amplification, and the amplification factor varies as a function of time, the signal transmitted by each of the sensors to the signal processing system of the receiver has a value that depends on the precise instant when the photons have been received and detected by the sensors. Thus, the signal emitted by the sensor receiving the proportion P2 (FIG. 8a) is less than the signal transmitted by the sensor having received the proportion P3 (FIG. 8b), which is in turn less than the signal emitted by the sensor having received the proportion P4 (FIG. 8c), which is in turn less than the signal emitted by the sensor having received the proportion P5 (FIG. 8d).

These signals are transmitted to the signal processing device of the receiver which can determine the distance of the point having reflected the signal for each individual sensor since it can determine the precise instant at which the photons were detected. This distance is equal to:

$$I_x = C^* (t_d + t_x)/2,$$

where "x" is equal to 2, 3, 4 or 5 for FIGS. 8a, 8b, 8c, 8d, and "c" is the speed of light (approximately, hereinafter, $3 \times 10^{+8}$ ms$^{-1}$).

If, for example, the detection delay $t_d$ is set at 6 microseconds ($6 \times 10^{-6}$ s) and the integration time $\delta t$ is equal to 10 nanoseconds ($10 \times 10^{-9}$ s), then only the objects situated between nine hundred meters and nine hundred and one point five meters will be detected ($I_{min}=900$ m and $I_{max}=901.5$ m). When the first sensor emits a signal to the data processing circuit, the value of the signal emitted by the sensor is compared to the value of the signal received by the sensor to determine the amplification gain of the signal. Knowing the value of the gain, and knowing the gain variation law as a function of time, the precise instant when the signal returns can be determined.

The inventive method can be used with a detection delay $t_d$ taken from the range from 20 nanoseconds to 200 microseconds. The inventive method is also particularly suitable for an integration time $\delta t$ taken from the range from 10 nanoseconds to 2 microseconds, preferably from the range from 30 nanoseconds to 300 nanoseconds. There is no preference concerning the choice of detection delay $t_d$, because this corresponds to the distance at which observation is required: 20 nanoseconds corresponds to 3 meters and 200 microseconds corresponds to 30 kilometers. The choice of the time therefore depends on the detector and its speed of response. On the other hand, the integration time $\delta t$ corresponds to the accuracy and it may be desirable, for example, to work with a resolution of 1.5 meters (corresponding to an integration time $\delta t$ of 10 nanoseconds), 4.5 meters (corresponding to an integration time $\delta t$ of 30 nanoseconds), 45 meters (corresponding to an integration time $\delta t$ of 300 nanoseconds) or 300 meters (corresponding to an integration time $\delta t$ of 2 microseconds).

Figure 8A:
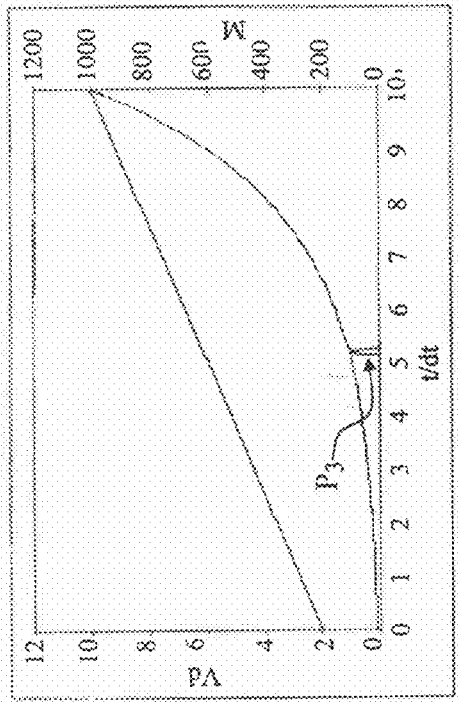
FIGS. 8a to 8d, diagrams illustrating an example of the time variation of the gain of the sensor of FIG. 10 according to the supply voltage and the signal transmitted by each individual sensor on implementing the detection method according to the invention.
Figure 8B:
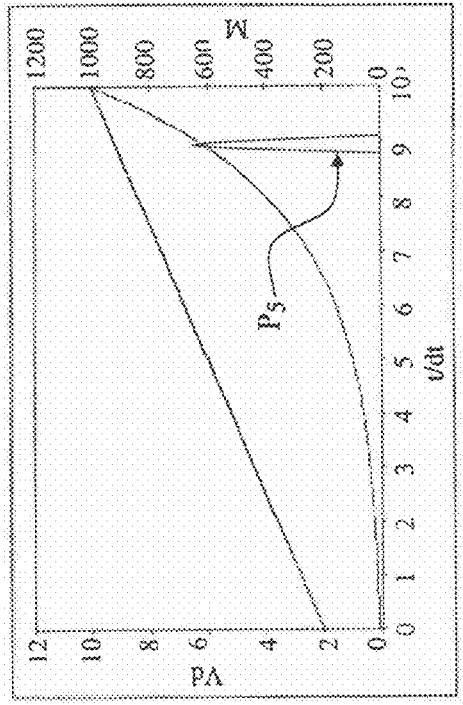
Figure 8C:
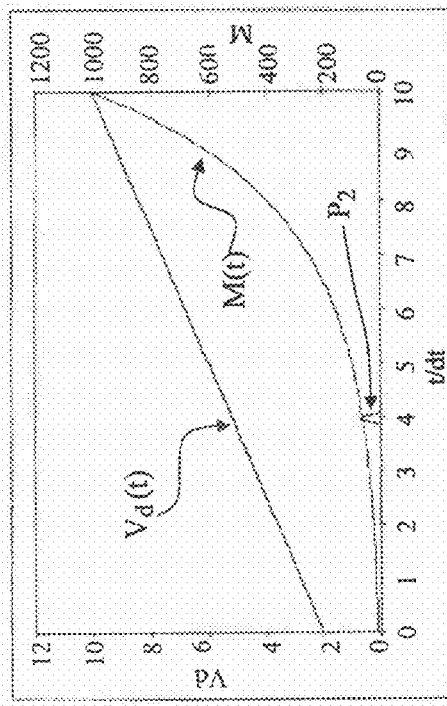
Figure 8D:
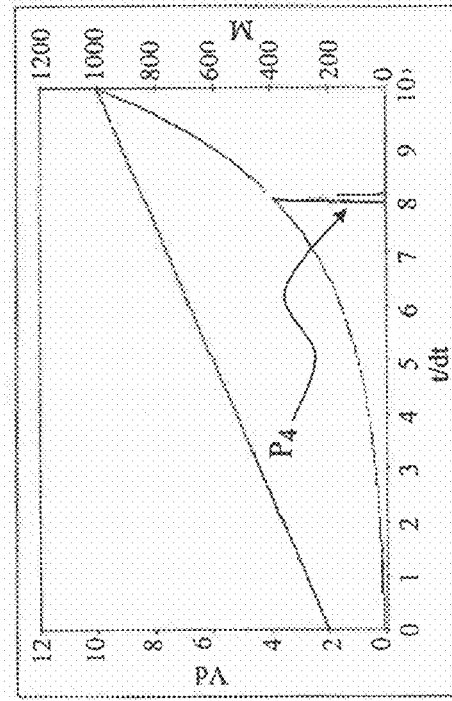

In FIG. 8a, it can be seen that the signal has been received by the sensor three nanoseconds after the detection delay $t_d$ and the start of the integration time $\delta t$ which lasts ten nanoseconds. The same applies for FIG. 8b where the signal has been received five nanoseconds after the start of the integration time $\delta t$, for FIG. 8c where the signal has been received eight nanoseconds after the start of the integration time $\delta t$, and for FIG. 8d where the signal has been received nine nanoseconds after the start of the integration time $\delta t$.

The distance $I_2$ of the point having reflected the signal P2 is therefore 900.45 m, the distance $I_3$ of the point having reflected the signal P3 is therefore 900.75 m, the distance $I_4$ of the point having reflected the signal P4 is 901.2 m and the distance $I_5$ of the point having reflected the signal P5 is 901.35 m.

These distances determined in this way can be transformed into a digital signal that can be displayed on a display interface or that can be stored in a memory, or that can be combined with data obtained from other types of detectors (such as radar emitters/detectors). Thus, in a light pulse, it is possible to obtain the distance image with significant accuracy. This image is illustrated in FIG. 9 where only eight distances $D_{2a}$ to $D_{2d}$ and $D_{3a}$ to $D_{3d}$ are represented. In reality, the image obtained with the inventive method is much more accurate since each pixel of the image corresponds to the measured distance of the part of the corresponding scene being observed.

One drawback of this method lies in the approximation according to which the number of photons emitted in the light pulse is equal to the number of photons returned. Now, in reality, the observed objects, even the different points of each object, present a capacity to return photons that differs according to the nature, or the structure, of the object. For example, the trunk of a tree would reflect the photons in a different way to the leaves. The signal P5 therefore ought to be different from the signal P4, not only by its return instant but also by its different power due to difference in reflectivity of the trunk and of the leaves.

According to one embodiment of the invention, the method consists, prior to the steps described previously, in emitting a first light pulse and in detecting the reflected signal while keeping the gain constant during the integration time $\delta t$. By doing that, an indication is obtained concerning the reflectivity of each of the objects without having information concerning their distance. Then, a second light pulse of the same intensity and the same duration as the first is emitted then detected while varying the amplification gain during the integration time. There is then obtained, as explained previously, an indication concerning the distance of the objects. If the time interval between the two light pulses is sufficiently short, it can be assumed that the observed objects have not moved and that one and the same point of an object reflects in the same way both light pulses. The signal processing system can then establish the ratio between the signal obtained with variable gain and the signal obtained with constant gain, so as to be able to disregard the number of photons received by the individual sensors of the receiver. The quality of determination of the distance of the objects is therefore substantially enhanced. The reflectance photograph can also be taken after the distance photograph.

At constant gain, the reflectance signal $N_r$, expressed as a number of charges, is calculated as follows:

$$N_r = M_r^* N_p$$

where $M_r$ is the value of the constant gain during the time $\delta t$, and $N_p$ is the number of photons received.

With variable gain, the distance signal $N_x$ is calculated as follows:

$$N_x = M(t_d + t_x)^* N_p$$

where $M(t_d+t_x)$ is the value of the variable gain at the detection instant $t_d+t_x$.

An image representing the corrected distance indication can then be obtained by calculating, for each pixel, that is for each individual sensor:

$$N_x/N_r = M(t_d+t_x)/M_r \quad \text{(relation 1)}$$

In the example illustrated where the gain M(t) varies exponentially during the time $\delta t$, the relation 1 is expressed:

$$N_x/N_r = \exp(\beta \cdot t_x)$$

where $\beta$ is a constant dependent on $M_r$ and on the gain variation law M(t) variable as a function of time.

To implement the method described previously, the invention also relates to an individual sensor of light signals (FIG. 10) and to an active imaging device comprising a receiver provided with a detection matrix comprising individual sensors of light signals with variable gain each defining a pixel.

An individual sensor according to the invention comprises, in a general way, a photon detector 10 able to generate an electrical signal relative to the number of photons detected, connected to a reading circuit 50 that makes it possible to integrate the signal generated by the photon detector 10 into a storage element such as one or more capacitors, a transistor, etc. The photon detector and/or the reading circuit presents or present an amplification gain, and an amplification gain control means is positioned in the sensor to act on the photon detector and/or the reading circuit to vary, in a controlled manner, during the integration time δt, the signal received or emitted by the reading circuit. For example, the gain control means can linearly vary over time the voltage $V_d$ across the terminals $V_{ref}$ and $V_{out}$ of the photon detector. The control means can be a simple electrical connection connecting the photon detector and/or the reading circuit of each sensor to an electronic control component situated outside the individual sensors and outside the detection matrix.

FIGS. 11 and 12 illustrate particular embodiments of a sensor according to the invention adapted for the gain variation during the integration time δt to happen at the level of the photon detector.

Thus, the sensor according to FIG. 11 presents an avalanche-effect photodiode 10, connected to a transimpedance amplifier 20 (CTIA) and a capacitor as storage element 30. By varying the potential $V_s$, the gain of the APD 10 is varied.

Figure 13:
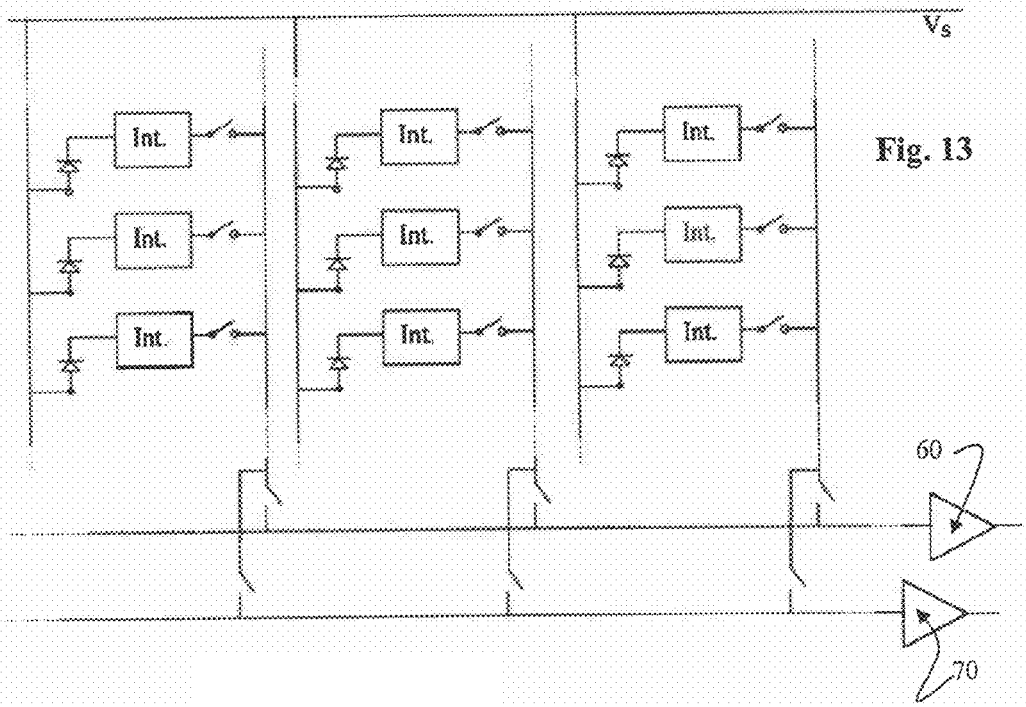
FIGS. 13 and 14, diagrammatic views of assembly configurations, respectively of the embodiments of sensors of FIG. 11 and FIG. 12.

This embodiment presents the advantage of a simple construction making it possible to have an APD gain control circuit connected to the potential $V_s$ remotely located outside each sensor, that is outside of each pixel. This makes it possible to increase the number of pixels for one and the same detection matrix size, and therefore increase the resolution of the device. FIG. 13 illustrates this configuration of several sensors according to FIG. 11 to produce a detection matrix. All the APDs 10 are connected to the potential $V_s$. The CTIA 20 and the capacitive storage element 30 are diagrammatically represented by an integration site 40 delimited by broken lines. The signal generated by the APD 10 when it receives the photons therefore depends on the instant when the photons are detected by the APD. The duly generated current is amplified and stored in the capacitive element 30 then sent, at the end of the integration time δt, to a signal processing means (not represented) that can display the signal on at least one display interface 60-70, or that can store this signal or combine it with other signals.

The video signal is formatted outside the detection matrix by a signal processing means which performs a read for each row of diodes. When the distance signal (time-variable gain integration mode) is corrected by a reflectance indication (time-constant gain integration mode), the two video signals of the two integration modes can be obtained on two independent video outputs 60 and 70. Preferably, the distance indication is firstly corrected relative to the reflectance indication, then displayed on the video output in place of the raw (uncorrected) distance indication.

In a second embodiment of the invention represented in FIG. 12, each individual sensor contains two integration elements 31 and 32. Thus, when a first light pulse is emitted then received by the photodiode, a first signal is generated by the APD and integrated in the integration element 31. When a second light pulse is emitted then received by the APD 10, a second signal is generated then stored in the integration element 32.

Figure 14:
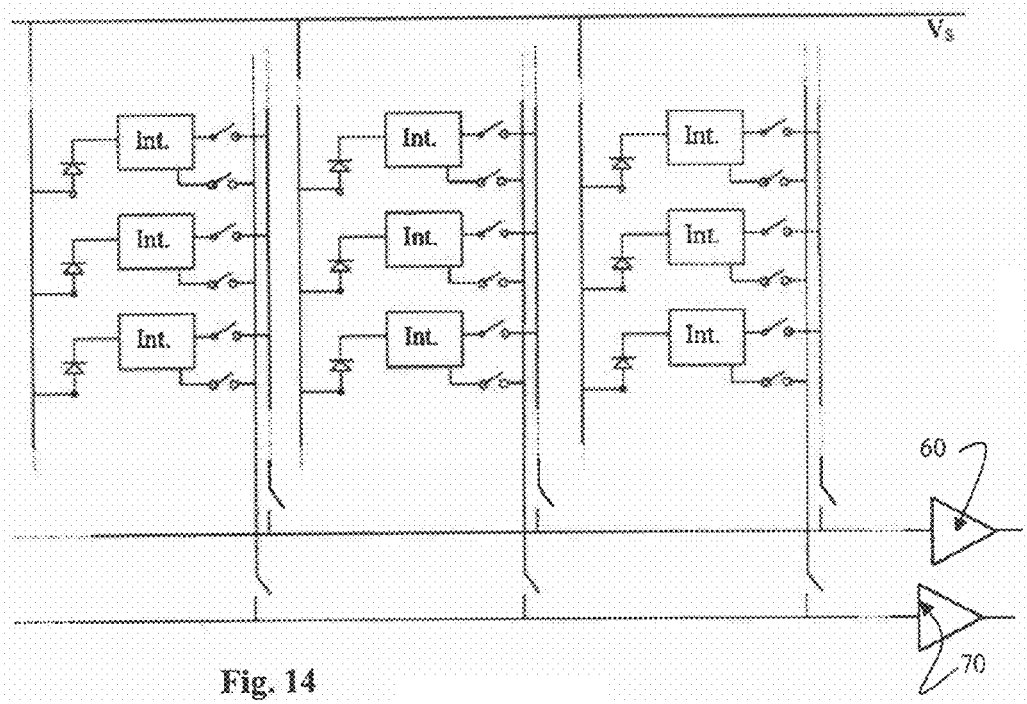

Thus, the two signals can be integrated during a frame time and with a low time difference, determined by the offset of the two light pulses. This implementation is less sensitive to rapid movements of the objects in the observed scene. The matrix form of this embodiment is illustrated in FIG. 14. With this embodiment, it is possible to obtain the ratio of the two signals in each pixel, that is, in each individual sensor.

The invention also comprises the method of implementing the embodiments described previously, where the polarization variation of the APD is driven by the potential $V_{ref}$.

A third embodiment according to the invention (not represented) makes it possible to obtain a reflectance image and a distance image in a single light pulse. In this embodiment, the constant gain and variable gain operating modes are alternated between each pixel. In other words, when one sensor is connected to amplification gain control means able to vary the gain during the detection, the sensors that surround it present a constant amplification gain during the detection. The reflectance and distance indications can thus be obtained with time consistency, for example by forming the two video signals within an effective pixel 2*2, which takes the average of two constant gain pixels and two variable gain pixels.

According to another embodiment of the invention, the time-variable gain can be obtained within the reading circuit, for example by using a current mirror. The gain of the APD is then sufficiently high for the integrated signal to be less sensitive to the noise of the reading circuit.

Figure 15:
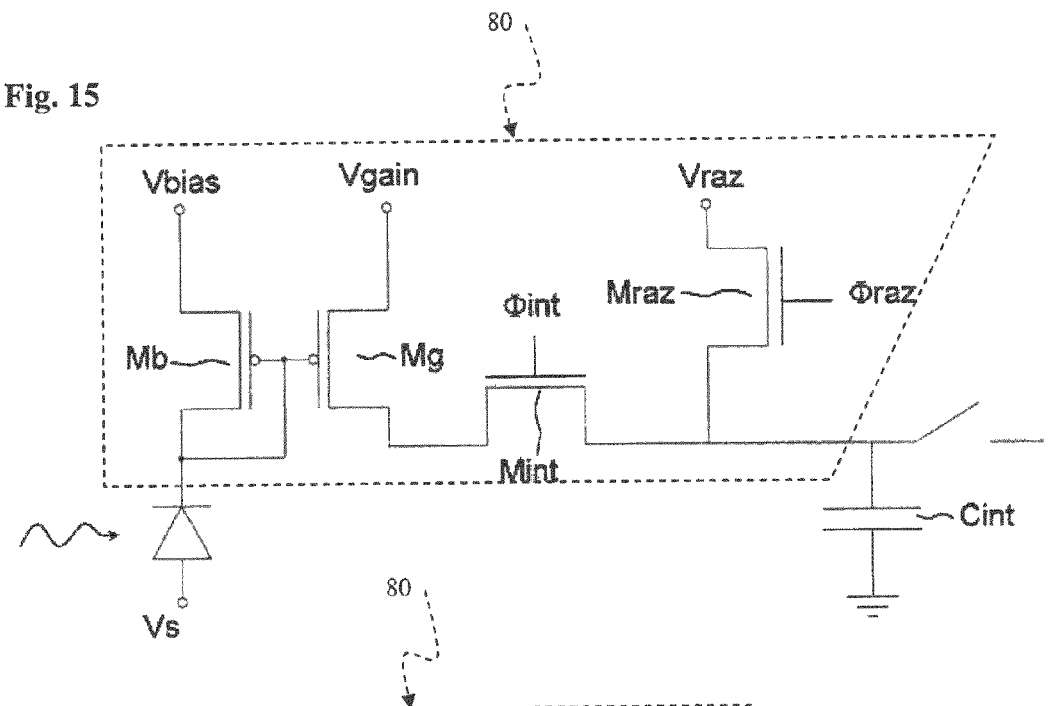
FIGS. 15 and 16, diagrammatic views of two embodiments of sensors according to the invention, adapted to a variation of the gain of the reading circuit of the sensor.

An example of this embodiment is illustrated in FIG. 15, in which the APD 10 is connected to a current mirror 80 of which the current gain is controllable by the value of the potential difference between the potential $V_{bias}$ and the potential $V_{gain}$, the potential Vf remaining constant. The signal amplified in this way during an integration time $δt_1$ is stored in the capacitive storage element $C_{int}$.

As described previously, each detector can also comprise two integration elements $C_{int1}$ and $C_{int2}$ connected to the current mirror 80.

Figure 16:
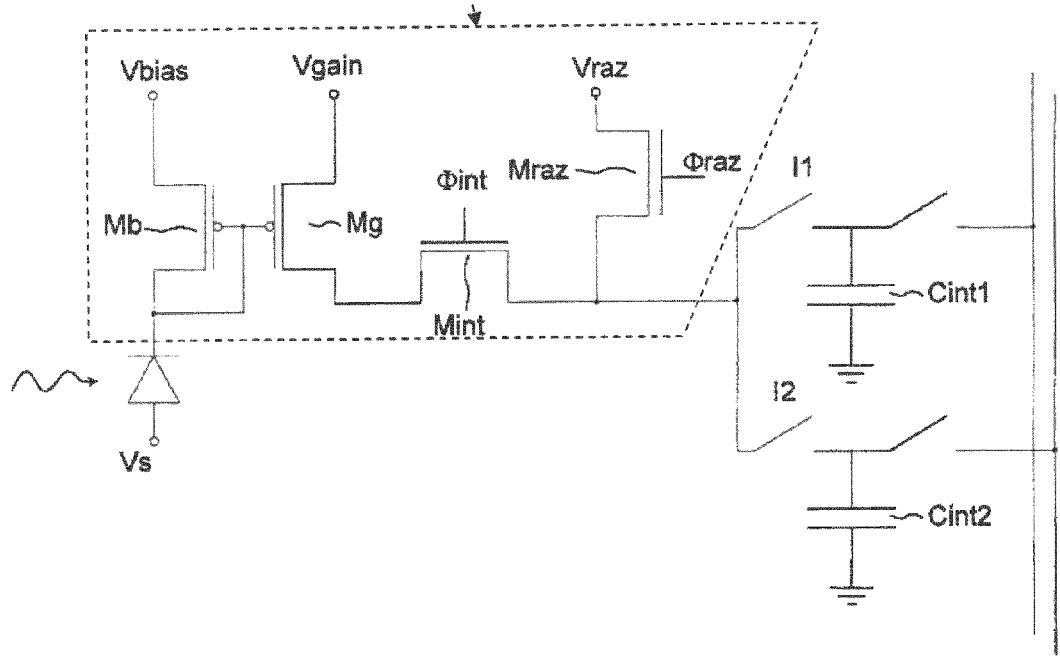

By varying the voltage $V_{gain}$ over time, the signal emitted by the APD in response to the reception of photons is amplified over time, then stored in the capacitive storage element $C_{int}$ (FIG. 15) or $C_{int1}$ (FIG. 16). The duly stored signal gives the distance indication. When a second light pulse is emitted, the voltage $V_{gain}$ is kept constant during the integration time $δt_2$. The signal emitted once again by the avalanche photodiode 10 is then once again stored in the capacitive element $C_{int}$ when the latter has been read by the signal processing means (FIG. 15), or stored in a second capacitive element $C_{int2}$ (FIG. 16). The display is then obtained as explained for FIGS. 13 and 14. According to the applications, the display can be replaced by or combined with another information transformation signal (transformation to digital signal, storage, etc.).

Thus, by controlling the gain of each detector over time, it is possible to obtain in one, even two, light pulses, an accurate indication of distance and reflectance of an observed object. By repeating this pulse, or these two pulses, a large number of times for each time unit, an accurate image is obtained in real time, whether the objects are immobile or not. Furthermore, the electronics used are simple to design and implement, and provide an enhanced resolution because each sensor presents a small surface. Finally, the distance resolution of the observed objects is greater than the limitations induced by the components themselves and, in particular, regarding the parameter δt. For a minimum δt induced by the components, it is, in effect, possible to determine, within this time, the exact instant of the return of the photons.

Numerous variants and alternatives can be added without in any way departing from the invention and, notably:
  the reading circuit is able to allow a cyclical integration of the signal emitted by the photon detector during a detection time (δt);
  the avalanche photodiode is made of cadmium-mercury-tellurium, and presents a gain that can be greater than 1000, a noise factor close to 1 (between 1 and 1.3), and a response time of the order of a nanosecond. Other APDs can be used such as those made of type II-VI semiconductor material (that is, comprising one or more materials taken from the second column of the Mendeleïev classification and one or more materials taken from the sixth column of said classification), photodiodes made of type III-V semiconductor material (that is, comprising one or more materials taken from the third column of the Mendeleïev classification and one or more materials taken from the fifth column of said classification), silicon photodiodes and germanium photodiodes;

the display can consist in displaying the distance of each point (each pixel) relative to the detection device (absolute distance of the points X of each object relative to the detection device: $I_{Xabs}=c*(t_d+t_x)/2$), but it is also possible to display the distance of each pixel X relative to a reference pixel Ref (relative distance of the points of each object in the "detection window" δt: $I_{Xrel}=I_{Xabs}-I_{Ref}$, let: $I_{Xrel}=c*(t_x-t_{Ref})/2$);

the signals obtained from each individual sensor can be stored and/or merged with data or signals obtained from other sources, such as radar detectors.

The invention claimed is:

1. A method of detecting a light pulse reflected on an object, comprising steps of:
   emitting a light pulse of known intensity and duration towards the object;
   detecting a reflection signal of the light pulse on the object during a first integration time,
   wherein, the detecting is carried out with at least one sensor with variable gain that amplifies the reflection signal;
   on detection during the first integration time, varying an amplification gain of the at least one sensor in a controlled manner so that the amplification gain at each instant of the first integration time is known; and
   determining a time of return of the reflection signal by evaluating the amplification gain of the reflection signal,
   wherein the process includes, prior to the emitting the light pulse, preliminary steps of,
      emitting a preliminary light pulse of known intensity and duration towards the object, and
      detecting a reflection signal of the preliminary light pulse on the object during a second integration time, with at least one gain sensor, able to amplify the reflection signal of the preliminary light pulse, with a gain being kept constant throughout the second integration time; and
   subsequent to the determining, calculating a ratio of the reflection signal of the light pulse to the reflection signal of the preliminary light pulse.

2. The method as claimed in claim 1, further comprising, subsequent to the determining, steps of:
   emitting another light pulse of known intensity and duration towards the object;
   detecting a reflection signal of the another light pulse on the object during a second integration time, with at least one gain sensor, able to amplify the reflection signal of the another light pulse, with a gain being kept constant throughout the integration time; and
   calculating a ratio of the reflection signal of the light pulse to the reflection signal of the another light pulse.

3. The method as claimed in claim 1, wherein the detecting of the reflection signal begins after a determined detection delay.

4. The method as claimed in claim 3, wherein the detection delay is within a range from 20 nanoseconds to 200 microseconds.

5. The method as claimed in claim 1, wherein the first integration time is within a range from 10 nanoseconds to 2 microseconds.

6. The method as claimed in claim 1, wherein the first integration time is the same as the second integration time.

7. An active light imaging device comprising:
   an emitter and a receiver of light pulses; and
   means for processing a signal emitted by the receiver after reception,
   wherein the receiver includes a detection matrix provided with a plurality of the sensors, the plurality of sensors including,
      a photon detector that generates a signal relative to a number of photons detected during an integration time, wherein said photon detector detects a reflection signal of a light pulse on an object, and
      a reading circuit, connected to the photon detector, that integrates the signal generated by the photon detector into a storage element,
   wherein the reading circuit includes means for controlling an amplification gain of the photon detector or the reading circuit so that the amplification gain of the sensor is varied in a controlled manner so that the amplification gain at each instant of the integration time is known,
   wherein the plurality of sensors included in the detection matrix alternate between a sensor that has its amplification gain varied by the means for controlling during the integration time and a sensor that has its amplification gain maintained constant by the means for controlling during the integration time.

8. The active light imaging device as claimed in claim 7, further comprising:
   a light source that emits the light pulse towards the object; and
   at least two storage elements, wherein a first storage element stores a signal corresponding to the reflected signal received by the photon detector, and the other storage element stores a signal corresponding to another reflected signal received by the photon detector.

9. The active light imaging device as claimed in claim 7, wherein the reading circuit is able to allow a cyclical integration of a signal emitted by the photon detector during integration time.

10. The active light imaging device as claimed in claim 7, wherein the reading circuit comprises at least one capacitor connected to a transimpedance amplifier.

11. The active light imaging device as claimed in claim 7, wherein the photon detector is an avalanche photodiode.

12. The active light imaging device as claimed in claim 11, wherein the avalanche photodiode is taken from a group comprising photodiodes made of type II-VI semiconductor material, photodiodes made of type III-V semiconductor material, silicon photodiodes and germanium photodiodes.

13. The active light imaging device as claimed in claim 12, wherein the avalanche photodiode is made of cadmium-mercury-tellurium.

14. The active light imaging device of claim 7, wherein the photon detector presents the amplification gain and the means for controlling acts on the photon detector to vary the amplification gain in the controlled manner during the integration time.

15. The active light imaging device of claim 7, wherein the reading circuit presents the amplification gain and the means for controlling acts on the reading circuit to vary the amplification gain in the controlled manner during the integration time.

* * * * *